United States Patent
Satou et al.

[11] Patent Number: 6,082,906
[45] Date of Patent: Jul. 4, 2000

[54] ROLLING BEARING

[75] Inventors: Takanobu Satou; Yasuo Murakami, both of Kanagawa, Japan

[73] Assignee: NSK Ltd., Tokyo, Japan

[21] Appl. No.: 09/175,949

[22] Filed: Oct. 21, 1998

[30] Foreign Application Priority Data

Oct. 21, 1997 [JP] Japan .................................. 9-288717

[51] Int. Cl.[7] .................................................. F16C 33/58
[52] U.S. Cl. ........................................... 384/516; 384/450
[58] Field of Search ................... 384/450, 490, 384/513, 516

[56] References Cited

U.S. PATENT DOCUMENTS

| | | | |
|---|---|---|---|
| 2,142,477 | 1/1939 | Murden | 384/516 |
| 2,142,478 | 1/1939 | Murden | 384/516 |
| 3,370,899 | 2/1968 | Eklund | 384/516 |
| 3,647,268 | 3/1972 | Haines | 384/516 |
| 4,334,721 | 6/1982 | Satoh et al. | 384/450 |
| 4,431,236 | 2/1984 | Orain . | |
| 4,565,457 | 1/1986 | Flander | 384/450 |
| 5,501,530 | 3/1996 | Nagai et al. | 384/516 |

FOREIGN PATENT DOCUMENTS

| | | | |
|---|---|---|---|
| 64-65327 | 3/1969 | Japan | F16C 33/66 |
| 4-73422 | 3/1992 | Japan | F16C 33/62 |
| 5-86026 | 11/1993 | Japan | F16C 33/62 |
| 9-177795 | 7/1997 | Japan | F16C 33/58 |
| 835421 | 5/1960 | United Kingdom . | |

*Primary Examiner*—Thomas R. Hannon
*Attorney, Agent, or Firm*—Sughrue, Mion, Zinn, Macpeak & Seas, PLLC

[57] ABSTRACT

A deep-raceway ball bearing 1 as a ball bearing includes an inner ring 2, an outer ring 3 and a rolling element 4. The inner ring 2 is annular as a whole and circular in cross section. A rotary shaft 5 is fastened to the inner peripheral surface of the inner ring 2. The outer ring 3 is annular as a whole and circular in cross section, and larger in inside diameter than the inner ring 2. A plural number of rolling elements 4 are disposed in reliable fashion between the inner ring 2 and the outer ring 3, while being in contact with the outer peripheral surface 6 of the inner ring 2 and the inner peripheral surface 7 of the outer ring 3. The outer peripheral surface 6 of the inner ring 2, while extending in the circumferential direction thereof, is curved inward to form an inner raceway 8 circular in cross section. The inner peripheral surface 7 of the outer ring 3, while extending in the circumferential direction thereof, is also curved inward to form an outer raceway 9 circular in cross section. The radius of curvature of the inner raceway 8 of the inner ring 2 is selected to have a value within the range from 50.5% of the diameter da of each rolling element 4 to a value less than 52% of the same. The radius of curvature of the sectionally circular groove 9 of the outer ring 3 is selected to have a value more than 52.0% of the diameter da of each rolling element 4 and equal or less than 55.0% of the same.

6 Claims, 2 Drawing Sheets

ROLLING BEARING

BACKGROUND OF THE INVENTION

The present invention relates to a rolling bearing used for various machineries in the industrial fields of automobiles, electricity, information processing, steel and others, and various types of metal cutting-machine tools and industrial machinery.

FIG. 1 typically illustrates a deep-raceway rolling bearing, which is used for various machineries in the industrial fields of automobiles, electricity, information processing, steel and others, and various types of metal cutting machine tools and industrial machinery. Design requirements of the rolling bearing 1 are: its lifetime is long, and its torque, e.g., starting torque and dynamic friction torque, are low.

The deep-raceway rolling bearing 1 illustrated in FIG. 1 is an assembly made up of inner and outer rings or races 2 and 3, circular in section but annular as a whole, and a plural number of rolling elements 4, e.g., balls, which are located and rotated between the inner and outer rings 2 and 3.

A rotary shaft 5 indicated by a long and two short dashed line is fastened to the inner periphery surface of the inner ring 2. The inner ring 2 and the rotary shaft 5 are rotatable in unison about the axial line P of the rotary shaft 5 with respect to the outer ring 3.

A raceway 8, circular in cross section, is formed in and along a contact surface of the inner ring 2 where the inner ring comes in contact with the balls. Similarly, a raceway 9, circular in cross section, is formed in and along a contact surface of the outer ring 3 where the outer ring comes in contact with the balls. In the general design of the inner raceway 8 of the inner ring 2 of the deep-raceway ball bearing 1, the radius of curvature of the raceway 8 is selected to have a value of 52% of the diameter da of the deep-raceway ball bearing 1.

The structure of the conventional deep-raceway ball bearing 1 has the following inherent features:

1) a distance between the axial line P of the rotary shaft 5 and the inner-raceway diameter 36 as the bottom of the inner raceway 8 of the inner ring 2 is not equal to a distance between the axial line P of the rotary shaft 5 and the outer-raceway diameter 37 as the bottom of the outer raceway 9 of the outer ring 3; and
2) the curvature direction of the inner raceway 8 with respect to each ball 4 is not coincident with that of the outer raceway 9 with respect to the same.

Because of those features, a maximum surface contact pressure between the inner raceway 8 of the inner ring 2 and each of the balls 4 is larger than that between the outer raceway 9 of the outer ring 3 and each ball 4. A so-called flaking phenomenon, in which the contact surface of the inner raceway 8 of the outer peripheral surface 6 of the inner ring 2 separates or falls in flakes, is liable to occur on the contact surface. This phenomenon reduces the lifetime of the deep-raceway ball bearing 1.

Because of the distance difference and the curvature difference that are already mentioned, a contact area between the outer raceway 9 of the outer ring 3 and the rolling element 4 is larger than that between the inner raceway 8 of the inner ring 2 and the rolling element 4. Thence, a contact pressure between the inner ring 2 and the balls 4 is larger than that between the outer ring 3 and the balls 4, so that the inner ring 2 flakes earlier than the outer ring 3. The result is to reduce the lifetime of the deep-raceway ball bearing 1.

A contact ellipse (that is, area of the contact surface) between the outer ring 3 and the ball 4 is larger than that between the inner ring 2 and the ball 4, so that the outer ring 3 is subject to a torque larger than the inner ring 2, and the outer ring 3 has a large contribution to heat generation as compared with the inner ring 2. This increases the torque and to promotes heat generation in the whole ball bearing.

SUMMARY OF THE INVENTION

Accordingly, it is an object of the present invention to provide a rolling bearing which suppresses the flaking of the inner ring, reduces the torque values and friction of the outer ring, and suppresses its heat generation by the friction, to thereby elongate the lifetime of the rolling bearing.

The above object can be achieved by a rolling bearing, according to the present invention, having inner and outer rings, and a plural number of rolling elements rotatably located between the inner and outer rings, the bearing having sectionally circular grooves formed in and along circumferential surfaces of the inner and outer rings where the inner and outer rings come in contact with the rolling elements, in which the rolling bearing satisfies at least one of conditions that:

(A). the radius of curvature of the sectionally circular groove of the inner ring is selected to have a value within the range equal or more than 50.5% of the diameter of each rolling element and less than 52% of the same; and (B). the radius of curvature of the sectionally circular groove of the outer ring is selected to have a value within the range more than 52.0% of the diameter of each rolling element and equal or less than 55.0% of the same.

In the rolling bearing thus constructed, the radius of curvature of the sectionally circular raceway of the outer ring is set to be large. This feature reduces the contact area of the raceway of the outer ring where it contacts with the rolling element, e.g., ball. Further, the radius of curvature of the raceway of the inner ring is set to be small. This feature increases the contact area of the raceway of the inner ring where it contacts with the rolling element, so that a maximum surface contact area between the contact area and the balls is reduced.

As a result, the difference between the maximum surface contact areas of the outer ring and the inner rings is reduced. The reduced maximum surface contact area difference effectively operates to reduce the flaking. Further, the contact area of the outer ring is small, and the contact area of the inner ring is large. This fact reduces the torque values and friction of the outer ring, and hence suppresses its heat generation by the friction.

DETAILED DESCRIPTION OF THE PREFERRED EMBODIMENTS

Figure 1:
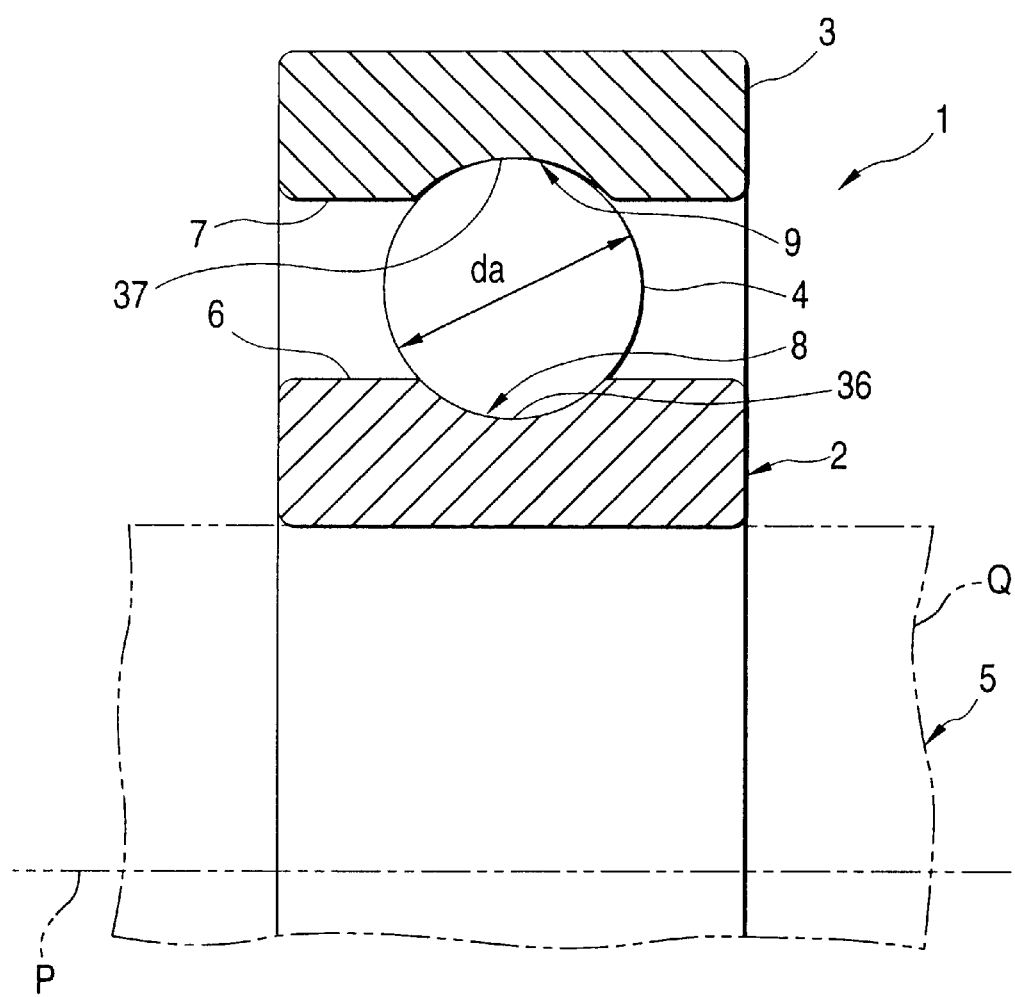
FIG. 1 is an enlarged view showing a part of a deep-raceway ball bearing as a ball bearing.

The preferred embodiment of the present invention will be described in detail with reference to FIGS. 1 and 2. For simplicity, like or equivalent portions will be designated by like reference numerals used in FIG. 1.

The deep-raceway ball bearing 1 as a ball bearing is a kind of rolling bearing, and used for various machineries in the industrial fields of automobiles, electricity, information processing, steel and others, and various types of metal cutting machine tools and industrial machinery. As shown in FIG. 1, the deep-raceway ball bearing 1 is an assembly including an inner ring 2, an outer ring 3 and a plural number of rolling elements 4, e.g., balls.

The inner ring 2 is annular as a whole and circular in cross section. A rotary shaft 5 indicated by a long and two short dashes line is fastened to the inner periphery surface of the inner ring 2. The inner ring 2 and the rotary shaft 5 are rotatable in unison about the axial line P of the rotary shaft 5 with respect to the outer ring 3.

The outer ring 3, which is also annular as a whole and circular in cross section, is larger in inside diameter than the inner ring 2. The rolling elements 4 are each spherical in shape, and in contact with the outer peripheral surface of the inner ring 2 and the inner peripheral surface of the outer ring 3 in a state that those elements are reliably held therebetween. The rolling elements 4 block the transmission of a rotation of the inner ring 2 relative to the outer ring 3 from one to the other.

The outer peripheral surface 6 of the inner ring 2 is curved inwardly over its entire length to form a groove 8 (referred to as an inner raceway), circular in cross section, which extends along the plurality of rolling elements 4. Similarly, the inner peripheral surface 7 of the outer ring 3 is curved inwardly to form a groove 9 (referred to as an outer raceway), circular in cross section, which extends along the rolling elements 4.

The radius of curvature of the inner raceway 8, which constitutes the outer peripheral surface 6 of the inner ring 2 is selected to have a value within the range equal or larger than 50.5% of the diameter da of each rolling element 4 and less than 52% of the same. The radius of-curvature of the sectionally circular groove 9, which constitutes the-inner peripheral surface 7 of the outer ring 3, is selected to have a value within the range more than 52.0% of the diameter da of each rolling element 4 to a value equal or less than 55.0% of the same.

Thus, the radius of curvature of the outer raceway 9 of the outer ring 3 is set at a value more than 52.0% of the diameter da of each rolling element or ball 4 conventionally used; and the radius of curvature of the inner raceway 8 of the inner ring 2 is set at a value less than 52.0% of the diameter a of each rolling element 4. The so selected figures of the radii of curvature of those raceways makes the contact area of the inner raceway 8 of the inner ring 2 (where it contacts with the rolling element 4) substantially equal to the contact area of the outer raceway 9 of the outer ring 3 (where it contacts with the rolling elements 4). As a result, the difference between those contact areas is less than that of the conventional deep-raceway ball bearing.

Further, a maximum surface contact pressure between the outer ring 3 and the rolling element 4 is larger than that of the conventional deep-raceway ball bearing, while a maximum surface contact pressure between the inner ring 2 and the rolling element 4 is smaller than that of the conventional deep-raceway ball bearing. The result is that the difference between those maximum surface contact pressure values is reduced.

Therefore, the torque values and friction of the outer ring are reduced, and hence its heat generation by the friction is suppressed. This leads to elongation of the lifetime of the deep-raceway ball bearing 1.

A deep-raceway ball bearing 6202 prescribed in B1513 in JIS (Japanese Industrial Standard) was manufactured and tested. The ball bearing (referred to as a first ball bearing) was designed such that the radius of curvature of the outer raceway 9 of the outer ring 3 was 52.5% of the diameter da of each rolling element 4, and the radius of curvature of the inner raceway 8 of the inner ring 2 was 51% of the diameter da of each ball 4. The first ball bearing was operated under 9.8 kN in dynamic equivalent load. The results are: a maximum surface contact pressure between the inner ring 2 and the rolling element 4 was 3.4 GPa and a maximum surface contact pressure between the outer ring 3 and the rolling element 4 was 3.8 GPa.

Another or conventional deep-raceway ball bearing (referred to as a second ball bearing) was manufactured. The radii of curvature of the inner raceway 8 and the outer raceway 9 of the inner ring 2 and the outer ring 3 were 52% of the diameter da of the ball 4. Other specifications for the shapes, dimensions, and like than the radii of curvature, were the same as those of the above-mentioned ball bearing. The second ball bearing was operated under 19.5 kN in a fundamental dynamic rated load and 9.8 kN in dynamic equivalent load. The results are: a maximum surface contact pressure between the inner ring 2 and the rolling element 4 was 3.90 GPa and a maximum surface contact pressure between the outer ring 3 and the rolling element 4 was 3.23 GPa.

Evaluation was made on the results of the tests. As for the second (conventional) ball bearing, the maximum surface contact pressure of the inner ring 2 is about 20% larger than that of the outer ring 3. For the first ball bearing (of the invention), the maximum surface contact pressure difference between the inner and outer rings 2 and 3 is reduced.

Comparison of the first ball bearing with the second ball bearing was made for the maximum surface contact pressure which is higher than the maximum surface contact pressures of the inner and outer rings 2 and 3. The result was that maximum surface contact pressure of the first ball bearing was about 15% smaller than that of the second ball bearing. Lundcrg-Palmgren's theory which is used for calculation of the lifetime of the deep-raceway ball bearing is based on the fact that the lifetime of the ball bearing will be shorter, the larger a stress increases. The theory teaches that the first ball bearing (of the invention) has an increased lifetime since its maximum surface contact pressure is reduced.

When the second ball bearing was operated under 9.8 kN in the dynamic rated load, the contact area between the inner ring 2 and the rolling element 4 was 1.92 mm$^2$, and that between the outer ring 3 and the rolling element 4 was 2.2 mm$^2$. When comparing those contact areas, the contact area of the outer ring 3 is about 1.2 times as large as that of the inner ring 2.

A further ball bearing was manufactured. The radius of the outer raceway 9 of the outer ring 3 was 52.2% of the diameter da of the rolling element 4, and the radius of the inner raceway 8 of the inner ring 2 was 51% of the diameter da of the rolling element 4. The contact areas of the manufactured ball bearing were measured: the contact area between the inner ring 2 and the rolling element 4 was 2.21 mm$^2$; and the contact area between the outer ring 3 and the rolling element 4 was 2.22 mm$^2$. As seen from the comparison of those figures, those contact areas are substantially equal to each other. Therefore, torques, e.g., starting torque, and friction which are produced between the outer ring 3 and the rolling element 4 are reduced.

The torques depend on the size of the contact surface, differential slip, elastic hysteresis and others. A distance between the contact surface of the outer ring 3 and the axial line P of the rotary shaft 5 is larger than that between the contact surface of the inner ring 2 and the axial line P. Therefore, a motion of the inner ring 2 relative to the rolling element 4 is different from that of the outer ring 3 relative to the rolling element 4. Thence, rates of torque generation for the inner and outer rings 2 and 3 are also different from each other.

The above fact implies that a proper combination of the radii of curvature of the inner and outer raceways 8 and 9 of the inner and outer rings 2 and 3, will provide an optimal combination of the areas of the contact surfaces of the inner and outer rings 2 and 3, which produces the least torque and friction. When considering the torque-generation-rate difference, it is preferable that the area of the contact surface is selected to be within the range from 85% to 100% of the surface contact pressure which is smaller of the maximum surface contact pressures between the inner ring 2 and the rolling element 4 and between the outer ring 3 and the rolling element 4.

It is noted that while the areas of the contact surface pressures between the inner ring 2 and the rolling element 4 and between the outer ring 3 and the rolling element 4 is uniquely determined in the conventional deep-raceway ball bearing, the inner and outer raceways 8 and 9 may be formed having the optimal combination of the radii of curvatures thereof which produces the least torque and friction between the inner and outer rings 2 and 3 in the deep-raceway ball bearing of the invention. With this technical feature, the torque and friction of the deep-raceway ball bearing of the invention are reduced when comparing with those of the prior ball bearing.

In the deep-raceway ball bearing 1, the number of repetitions of stress of the fixed ring which is either of the inner and outer rings 2 and 3 is liable to be larger than that of the fixed ring. In a case where the outer ring 3 is fixed while the inner ring 2 is rotatable, the number of repetitions of stress of the outer ring 3 is larger than that of the inner ring 2. Therefore, in this case, it is desirable to reduce the maximum surface contact pressure of the outer ring 3 by increasing the contact surface area of the outer ring 3 to be larger than that of the inner ring 2. In another case where the inner ring 2 is fixed while the outer ring 3 is rotatable, the number of repetitions of stress of the inner ring 2 is larger than that of the outer ring 3. In this case, it is desirable to reduce the maximum surface contact pressure of the inner ring 2 by increasing the contact surface area of the inner ring 2 to be larger than that of the outer ring 3.

A lifetime test of the deep-raceway ball bearing 1 of the invention was conducted to confirm its useful effects. The test will be described with reference to FIG. 2. In the test, the outer ring 3 is fixed, and the combination of the inner ring 2 and the rotary shaft 5 is rotatable. The results of the lifetime test of the deep-raceway ball bearing 6206 are plotted in FIG. 2. The test was a rolling fatigue test using a mineral oil. In the test, the inner ring 2 was rotated; the dynamic rated load was 9.8 kN; and the number of revolutions of the inner ring 2 was 1500 rpm.

Two examples 1 and 2 were tested: the example 1 is a group of deep-raceway ball bearings, and their lifetime data is calculated by use of a theoretical expression and indicated by a long,and short dash line; the example 2 is a group of conventional deep-raceway ball bearings, and their lifetime data gathered is indicated by a long and two short dashes line (also marked with triangle marks). A group of deep-raceway ball bearings 1 of the present invention were each constructed such that the radius of curvature of the inner raceway 8 of the inner ring 2 was 51% of the diameter da of the rolling element 4, and the radius of curvature of the outer raceway 9 of the outer ring 3 was 52.5%. The gathered lifetime data of the test on this ball bearing was indicated by a solid line (also marked with circle marks).

Figure 2:
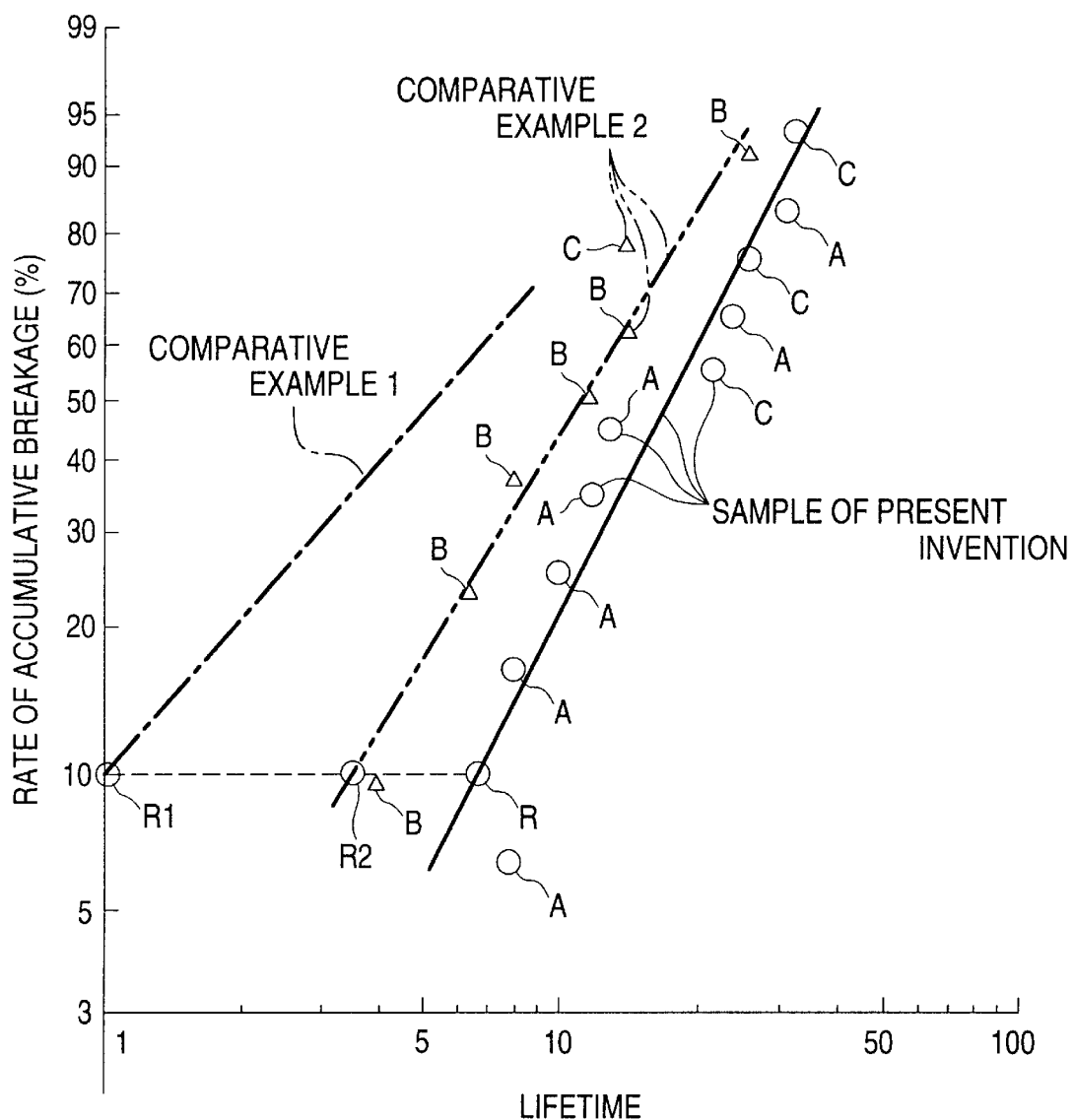
FIG. 2 is a graph comparatively showing the results of the lifetime test of the deep-raceway ball bearing 6206 and examples.

In the graph of FIG. 2, the abscissa represents the rating fatigue lifetime of those deep-raceway ball bearings. More exactly, a called rating fatigue lifetime is set at 1, and the total number of revolutions within which 90% of the group of ball bearings in the example 1 are operable free from the flaking is assigned to the rating fatigue lifetime. The fatigue lifetime on the abscissa is expressed in terms of the ratios of the fatigue lifetime to the rating fatigue lifetime. The ordinate represents the lifetime, i.e., a probability of accumulative breakage when the total number of revolutions is increased.

A point R2 of the rating fatigue lifetime in the example 2 is 3.5 times as large as a point R1 of the rating fatigue lifetime in the example 1. A point R of the rating fatigue lifetime of the ball bearings of the invention is 6.5 times as large as a point R1 of the rating fatigue lifetime in the example 1. From this, it is seen that the lifetime of the deep-raceway ball bearings 1 of the invention is approximately 1.8 times as large as that of the conventional deep-raceway ball bearing.

Characters A, B and C led out of actually measured values marked with triangular and circular marks indicate that the inner ring 2, the outer ring 3 and the rolling element 4 flake. In the example 2, the inner ring 2 and the rolling element 4, the maximum surface contact pressure between which is large, separate in flakes. The reason for this may be estimated such that the areas of the contact surface between the inner ring 2 and the rolling element 4 is substantially equal to that between the outer ring 3 and the rolling element 4, and hence the number of repetitions of stress of the outer ring 3 fixed is larger than that of the inner ring 2 rotatable.

In the example 2 of the conventional ball bearings, it is estimated that the outer ring 3 is fixed and hence the number of repetitions of stress of the outer ring 3 is large, and hence the difference of maximum surface contact pressure between the inner ring 2 and the outer ring 3 is reduced. If the inner ring 2 is fixed, the number of repetitions of stress of the inner ring 2 is large. Therefore, the lifetime of the ball bearing will be further reduced.

In the ball bearing of the present invention, the radii of curvature of the inner raceways 8 and 9 of the inner ring 2 and the outer ring 3 may properly be determined in accordance with the maximum surface contact pressures of the rings to the rolling element 4 and the number of repetitions of stress.

In the ball bearings 1 of the invention, the radius of curvature of the inner raceway 8 of the inner ring 2 was 51% of the diameter da of the rolling element 4, and the radius of curvature of the outer raceway 9 of the outer ring 3 was 52.5%. The radii of curvature of the inner raceway 8 and the outer raceway 9 are determined depending on which of reduction of the torque of the bearing or elongation of the lifetime is preferentially employed in designing the ball bearing, and are preferably within the range from 85% to 100% of the surface contact pressure which is smaller of the maximum surface contact pressures between the inner ring 2 and the rolling element 4 and between the outer ring 3 and the rolling element 4.

As already referred to, the number of repetitions of stress of the fixed ring is larger than that of the rotatable ring. Therefore, in forming the inner raceway 8 and the outer raceway 9, it is preferable that the maximum surface contact pressure of the fixed ring is smaller than that of the rotatable ring. Those raceways are not formed so that the area between the contact surface of the inner ring 2 and the rolling element 4 is nearly equal to that between the outer ring 3 and the rolling element 4.

From the foregoing description, it may be concluded:

1) The radius of curvature of the inner raceway 8 of the inner ring 2 is selected to have a value within the range equal or more than 50.5% of the diameter da of each rolling element 4 and less than 52% of the same;

2) The radius of curvature of the sectionally circular groove 9 of the outer ring 3 is selected to have a value within the range more than 52.0% of the diameter of each rolling element 4 to a value equal or less than 55.0% of the same; and 3) when one of the area of the contact surface between the inner ring 2 and the rolling element 4 and that between the outer ring 3 and the rolling element 4 is smaller in a maximum surface contact pressure than the other, it is preferable that the surface contact pressure at the one is set to be within the range from 85% to 100% of that at the other. (Note that, in a case where the surface contact pressure at that one is set to be 100% of that at the other, the longest lifetime of the bearing can be achieved. However, if these are set within the above-mentioned range, a longer lifetime of the bearing as a whole can be obtained, because the bearing as a whole has none of mechanically weak portion within that range.) The ball bearing designed satisfying the above conditions is long in lifetime and low in torque and friction when compared with the conventional ball bearing in which the radii of curvature of the inner raceway 8 and the outer raceway 9 are each 52% of the diameter da of the rolling element 4.

The present invention has been described in detail by use of the deep-raceway ball bearing 1 by way of example. It should be understood that the invention is applicable to an axial ball bearing and any other ball bearings where the radii of curvature of the inner and outer raceways are each 52% of the diameter of the rolling element. In this case, if the radii of curvature of the inner and outer raceways are combined as specified by the invention, low torque and low friction are secured.

As seen from the foregoing description, increase of the radius of curvature of the outer raceway of the outer ring entails reduction of the area of the contact surface between the outer raceway and the ball, and hence increase of the maximum surface contact pressure between the outer ring and the ball. Increase of the radius of curvature of the inner raceway of the inner ring entails increase of the area of the contact surface between the inner raceway and the ball, and hence decrease of the maximum surface contact pressure between the inner ring and the ball.

The difference of the maximum surface contact pressure between the inner ring and the outer ring is reduced. This leads to suppression of the flaking of the inner ring, and reduction of the contact area of the outer ring and increase of the contact area of the inner ring. The result is that the starting torque, for example, and friction of the outer ring are reduced, the heat generation due to the friction is lessened, and hence the lifetime of the ball bearing is elongated.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A rolling bearing having inner and outer rings, and a plural number or rolling elements located between said inner and outer rings, said bearing having sectionally circular grooves formed in and along circumferential surfaces of said inner and outer rings where said inner and outer rings come in contact with said rolling elements, wherein the radius of curvature of said sectionally circular groove of said inner ring is selected to have a value within the range equal to or more than 50.5% of the diameter of each of said rolling elements and less than 52% of the same, wherein the radius of curvature of said sectionally circular groove of said outer ring is selected to have a value within the range more than 52.0% of the diameter of each of said rolling elements and equal or less than the 55.0% of the same.

2. The rolling bearing according to claim 1, wherein said rolling bearing is a single row rolling bearing.

3. The rolling bearing according to claim 1, wherein the radius of curvature of the sectionally circular groove of the inner ring is smaller than the radius of curvature of the sectionally circular groove of the outer ring.

4. The rolling bearing according to claim 1, wherein when one of a contact surface area between the inner ring and the rolling element and that between the outer ring and the rolling element is smaller in a maximum surface contact pressure than the other, the surface contact pressure at the one is set to be within the range from 85% to 100% of that at the other.

5. The rolling bearing according to claim 4, wherein said rolling bearing is a single row rolling bearing.

6. The rolling bearing according to claim 4, wherein the radius of curvature of the sectionally circular groove of the inner ring is smaller than the radius of curvature of the sectionally circular groove of the outer ring.

* * * * *